US011116195B2

(12) United States Patent
Oogose et al.

(10) Patent No.: US 11,116,195 B2
(45) Date of Patent: Sep. 14, 2021

(54) SPOOL FOR A DUAL-BEARING REEL

(71) Applicant: Shimano Inc., Osaka (JP)

(72) Inventors: Hiroki Oogose, Osaka (JP); Akira Niitsuma, Osaka (JP)

(73) Assignee: Shimano Inc., Osaka (JP)

( * ) Notice: Subject to any disclaimer, the term of this patent is extended or adjusted under 35 U.S.C. 154(b) by 46 days.

(21) Appl. No.: 16/710,420

(22) Filed: Dec. 11, 2019

(65) Prior Publication Data
US 2020/0253181 A1    Aug. 13, 2020

(30) Foreign Application Priority Data

Feb. 8, 2019 (JP) .............................. JP2019-021438

(51) Int. Cl.
*A01K 89/01* (2006.01)
*A01K 89/015* (2006.01)

(52) U.S. Cl.
CPC .............................. *A01K 89/01931* (2015.05)

(58) Field of Classification Search
CPC .......... A01K 89/01931; A01K 89/0111; B65D 73/02; B65D 85/672; H05K 13/0084; H05K 13/0417; B65H 75/14
See application file for complete search history.

(56) References Cited

U.S. PATENT DOCUMENTS

| | | | |
|---|---|---|---|
| 6,047,918 A * | 4/2000 | Saito ...................... | B65H 75/14 242/125.2 |
| 6,932,295 B1 * | 8/2005 | Underkofler .......... | B65H 75/14 242/345.2 |
| 8,827,198 B1 * | 9/2014 | Steadman, Sr. ........ | B65H 75/14 242/608.4 |
| 2004/0079822 A1 * | 4/2004 | Kawasaki ............ | A01K 89/015 242/322 |
| 2011/0042500 A1 * | 2/2011 | Saito .................. | A01K 89/0111 242/224 |

FOREIGN PATENT DOCUMENTS

| JP | 5779516 B2 | 7/2015 |
|---|---|---|
| JP | 2017-127234 A | 7/2017 |

* cited by examiner

*Primary Examiner* — Emmanuel M Marcelo
(74) *Attorney, Agent, or Firm* — Global IP Counselors, LLP

(57) ABSTRACT

A spool of a dual-bearing reel includes a bobbin trunk, first and second flange portions and cylindrical portions. The first flange portion extends outwardly from the first end of the bobbin trunk and the second flange portion extends outwardly from the second end of the bobbin trunk. The first and second flanges do not have through-holes penetrating therethrough in an axial direction. The cylindrical portions extend outwardly from distal end portions of the flange portions. The first and second flange portions have a first tapered portion and a second tapered portion, respectively, each of the first and tapered portions becoming thinner in a radially outward direction. An average width between the first and tapered portions is less than or equal to 60% of an outer diameter of the cylindrical portion.

7 Claims, 4 Drawing Sheets

SPOOL FOR A DUAL-BEARING REEL

CROSS-REFERENCE TO RELATED APPLICATIONS

This application claims priority to Japanese Patent Application No. 2019-021438, filed on Feb. 8, 2019. The entire disclosure of Japanese Patent Application No. 2019-021438 is hereby incorporated herein by reference.

BACKGROUND

Field of the Invention

The present invention relates to a spool for a dual-bearing reel.

Background Art

In a conventional dual-bearing reel, in order to cast a lightweight lure a sufficient flight distance, it is necessary to reduce the inertia of the spool. For example, a conventional dual-bearing reel spool is known in which the weight of the spool has been reduced by forming a through-hole in the bobbin trunk or in a flange portion of the spool in order to reduce the inertia of the spool (refer to Japanese Laid-Open Patent Application No. 2017-127234 and Japanese Patent No. 5779516).

If a through-hole is formed in the bobbin trunk or a flange portion of the spool, the bending strength around the through-hole decreases, so that it is necessary to increase the thickness of the flange portion or the bobbin trunk to compensate for the decreased bending strength of the spool. Therefore, it is difficult to substantially reduce the inertia of the spool while maintaining its bending strength.

SUMMARY

The object of the present invention is to reduce the inertia of the spool while avoiding or reducing a decrease in the bending strength of the spool.

The spool of a dual-bearing reel according to one aspect of the present invention comprises a bobbin trunk, a pair of the flange portions, and cylindrical portions. The pair of flange portions extends outwardly from both ends of the bobbin trunk in the radial direction with respect to the axis of rotation of the spool. The pair of flange portions do not have a through-hole penetrating therethrough in the axial direction of the axis of rotation. The cylindrical portions extend from the distal end portions of the pair of flange portions outwardly in the axial direction of the axis of rotation. The pair of flange portions have tapered portions that decrease in thickness in the radially outward direction. The average width between the tapered portions is less than or equal to 60% of the outer diameter of the cylindrical portion.

In this spool of the dual-bearing reel, since there are no through-hole in the pair of flange portions, a decrease in the bending strength of the pair of flange portions can be avoided or suppressed while reducing the weight of the spool by decreasing the thickness of the pair of flange portions. In addition, since the thickness of the pair of flange portions increases with a decreasing distance to the bobbin trunk, it is possible to reduce the weight of the pair of flange portions while effectively avoiding or suppressing a decrease in the bending strength of the pair of flange portions. Moreover, since the average width between the tapered portions is less than or equal to 60% of the outer diameter of the cylindrical portion, the distance from the center of the bobbin trunk to the pair of flange portions is shorter than in the prior art, and it is possible to reduce the bending moment that acts on the bobbin trunk. It is thereby possible to maintain the bending strength of the bobbin trunk sufficiently, even if, for example, the weight is reduced by reducing the thickness of the bobbin trunk.

Preferably, the minimum diameter of the bobbin trunk is less than or equal to 60% of the outer diameter of the cylindrical portion. In this embodiment, since the distance between the bobbin trunk and the axis of rotation of the spool has been decreased, when the fishing line is wound around the spool, the distance from the center of gravity of the fishing line to the axis of rotation is also decreased. It is thereby possible to reduce the inertia of the spool during casting. In addition, it is possible to avoid a large reduction in the amount of line that can be wound on the spool.

Preferably, the thickness of the tapered portion decreases in the radially outward direction with a taper ratio of at least 0.3% and no more than 1%. In this case, it is possible to reduce the inertia of the spool while effectively suppressing decreased bending strength in the pair of flange portions.

Preferably, the thickness of the distal end portion of the tapered portion is greater than or equal to the thickness of the cylindrical portion. In this embodiment, it is possible to stably carry out a so-called thumbing operation for suppressing the rotation of the spool by bringing a finger into contact with the distal end portion of the tapered portion. In addition, since the thickness of the cylindrical portion is less than or equal to the thickness of the distal end portion of the tapered portion, the weight of the spool can be reduced.

Preferably, the thickness of the thickest portion of the tapered portion is at least 0.4 millimeters and no more than 0.6 millimeters. In this embodiment, it is possible to greatly reduce the inertia of the spool while effectively avoiding or suppressing a decrease in the bending strength of the pair of flange portions.

Preferably, the spool also has a disk-shaped connecting wall portion on the inner peripheral portion of the center of the bobbin trunk, the bobbin trunk has a through-hole formed only in the portion that is connected to the connecting wall portion, and the thickness of the bobbin trunk is at least 0.4 millimeters no more than 0.5 millimeters. In this embodiment, since the through-hole is formed only in the portion that is connected to the connecting wall portion of the bobbin trunk, it is possible to reduce the weight of the bobbin trunk while maintaining sufficient bending strength of the bobbin trunk, even if the thickness of the bobbin trunk is set to at least 0.4 millimeters and no more than 0.5 millimeters.

A dual-bearing reel according to one aspect of the present invention comprises a reel body, a handle rotatably disposed on the reel body, and the spool described above, rotatably disposed on the reel body. In this embodiment, it is possible to reduce the inertia of the spool of the dual-bearing reel while avoiding or suppressing a decrease in the bending strength of the spool.

According to the present invention, it is possible to reduce the inertia of the spool while avoiding or suppressing a decrease in the bending strength of the spool.

DETAILED DESCRIPTION OF EMBODIMENTS

Figure 1:
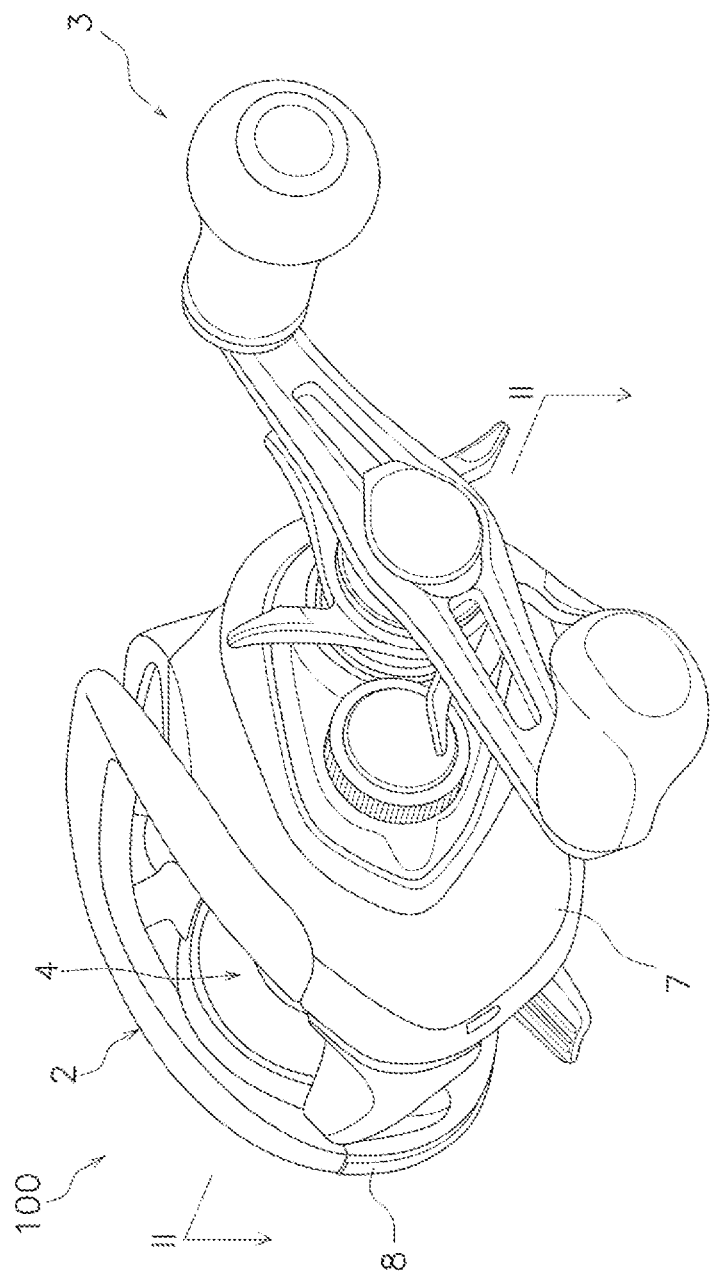
FIG. 1 is a perspective view of a dual-bearing reel.
Figure 2:
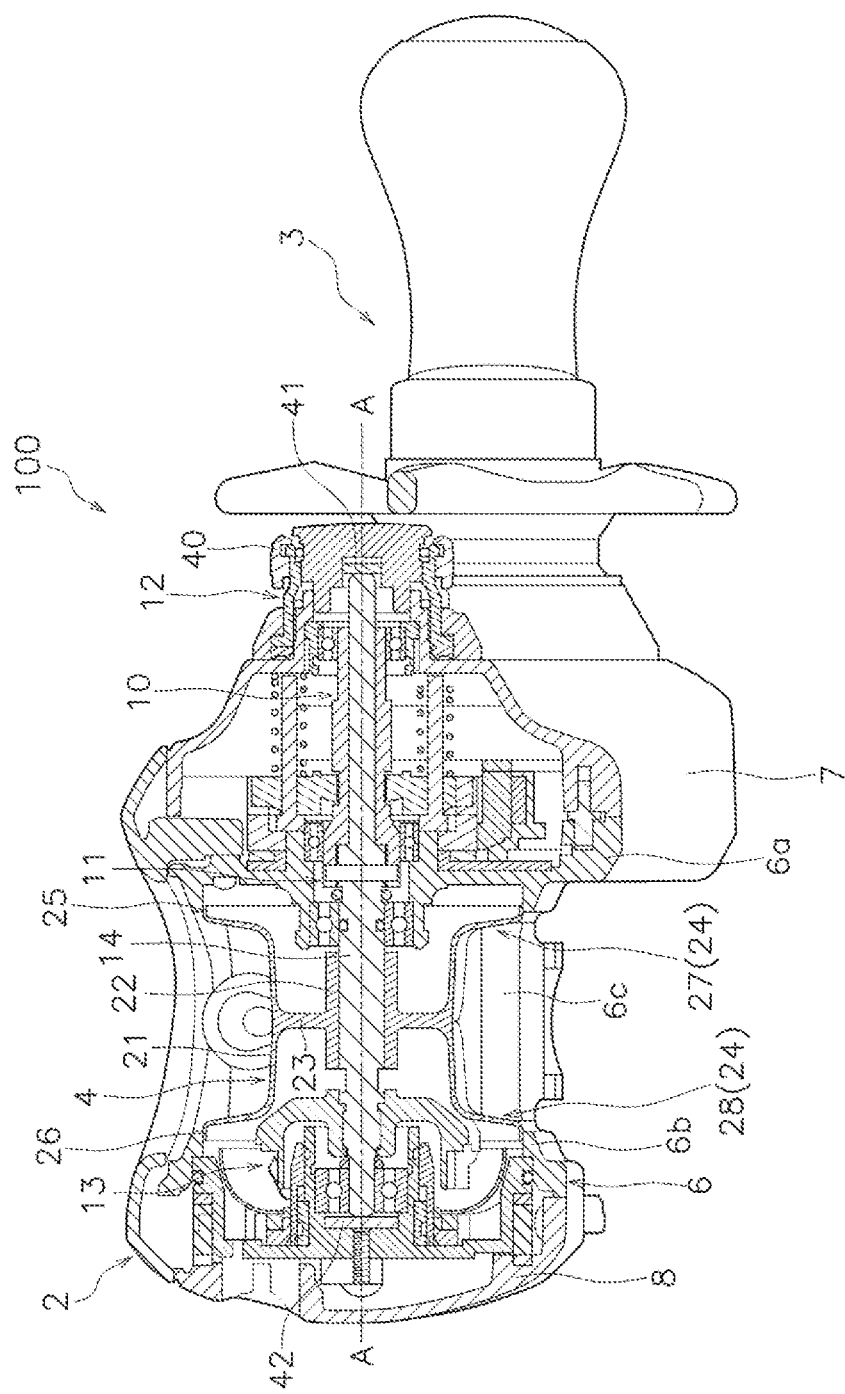
FIG. 2 is a cross-sectional view taken along line II-II of FIG. 1.

FIG. 1 is a perspective view of a dual bearing reel 100 according to a first embodiment of the present invention. FIG. 2 is a cross-sectional view taken along line II-II of FIG. 1. The dual bearing reel 100 is a small bait casting reel, for example, and is able to cast (unreel) a fishing line in a forward direction. The dual-bearing reel 100 comprises a reel body 2, a handle 3, and a spool 4. The dual bearing reel 100 further comprises a rotation transmission mechanism 10 for transmitting the rotation of the handle 3 to the spool 4, a clutch mechanism 11, a casting control mechanism 12, a spool braking mechanism 13, a drag mechanism (not shown), and the like.

In the following description, the direction in which fishing line is cast during fishing is referred to as the front, and the opposite direction is referred to as the rear. Additionally, left and right refer to left and right when the dual-bearing reel 100 is viewed from the rear. Moreover, the direction in which a spool shaft 14 (refer to FIG. 2) extends is referred to as the "axial direction," the direction orthogonal to the spool shaft 14 is referred to as the "radial direction," and the direction around the axis of the spool shaft 14 is referred to as the "circumferential direction."

The reel body 2 includes a frame 6, a right side cover 7 that covers the right side of the frame 6, and a left side cover 8 that covers the left side of the frame 6. The frame 6 includes a first side plate 6a, a second side plate 6b disposed spaced apart from the first side plate 6a in the axial direction, and a plurality of connecting portions 6c that connect the first side plate 6a and the second side plate 6b.

The handle 3 is rotatably mounted on a side of the reel body 2. In the present embodiment, the handle 3 is mounted on the right side of the reel body 2.

The spool 4 is made of an aluminum alloy, for example, and is rotatably supported by the reel body 2 between the first side plate 6a and the second side plate 6b. Specifically, the spool 4 is fixed to the spool shaft 14, which is rotatably supported by the reel body 2, and is rotatably supported by the reel body 2 via the spool shaft 14. In the present embodiment, the axis of rotation A of the spool 4 coincides with the axis of the spool shaft 14.

Figure 3:
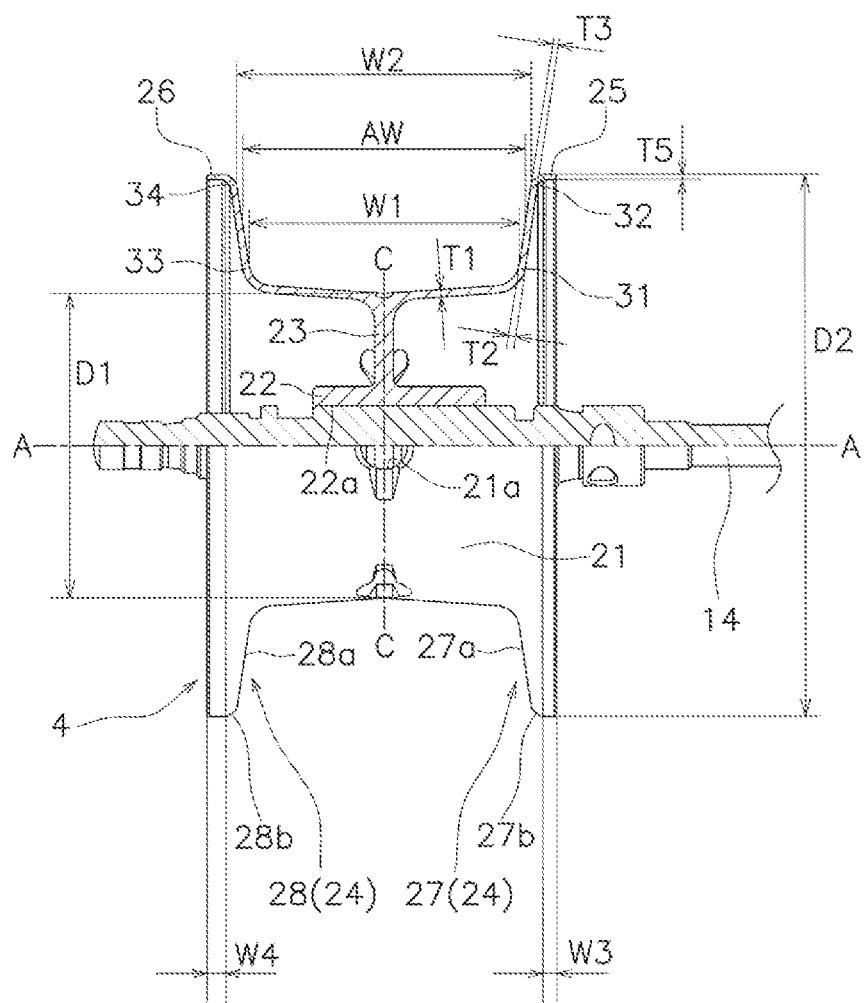
FIG. 3 is a half-sectional view of a spool to which a spool shaft is attached.

FIG. 3 is a partial-sectional view of the spool 4 to which the spool shaft 14 is attached. As shown in FIGS. 2 and 3, the spool 4 includes a bobbin trunk 21, a shaft mounting portion 22, a connecting wall portion 23, a pair of flange portions (e.g., a first flange portion and a second flange portion) 24, and cylindrical portions 25, 26.

The bobbin trunk 21 is essentially cylindrical in shape, and fishing line can be wound around the outer periphery. The outer circumferential surface of the bobbin trunk 21 is sloped such that the distance to the axis of rotation A gradually decreases with a decreasing distance to the center C of the bobbin trunk 21 in the axial direction. Thus, in the present embodiment, the diameter of the central portion of the bobbin trunk 21 is smallest at the minimum diameter D1 of the bobbin trunk 21.

The minimum diameter D1 of the bobbin trunk 21 is preferably less than or equal to 60% of an outer diameter D2 of the cylindrical portions 25, 26. The minimum diameter D1 of the bobbin trunk 21 is more preferably 50% or more and 60% or less of the outer diameter D2 of the cylindrical portions 25, 26. The minimum diameter D1 of the bobbin trunk 21 in the present embodiment is, for example, about 56% of the outer diameter D2 of the cylindrical portions 25, 26. Both ends of the bobbin trunk 21 are curved radially outwardly and are smoothly connected to the pair of flange portions 24.

Thickness T1 of the bobbin trunk 21 is preferably at least 0.4 millimeters and no more than 0.5 millimeters. The thickness T1 of the bobbin trunk 21 of the present embodiment is, for example, 0.45 millimeters.

The bobbin trunk 21 has a plurality of radially penetrating first through-holes 21a. First through-holes 21a are an essentially circular holes axially centered on the center C of the bobbin trunk 21. The center of the first through-holes 21a is disposed at a position overlapping the connecting wall portion 23 in the radial direction. The first through-holes 21a are formed at intervals in the circumferential direction of the bobbin trunk 21 at positions that overlap the connecting wall portion 23 in the radial direction. The diameter of the first through-holes 21a is slightly larger than the thickness of the connecting wall portion 23. The first through-holes 21a are formed only at portions of the bobbin trunk 21 that are connected to the connecting wall portion 23.

The shaft mounting portion 22 is disposed on the inner peripheral side of the bobbin trunk 21. The shaft mounting portion 22 has an axially penetrating through-hole 22a. The spool shaft 14 is press-fitted in this through-hole 22a, and the spool 4 and the spool shaft 14 rotate integrally.

The connecting wall portion 23 connects the bobbin trunk 21 and the shaft mounting portion 22. The connecting wall portion 23 is essentially disk-shaped, and extends from the inner peripheral portion at the center C axially with respect to the bobbin trunk 21 and radially inwardly toward the shaft mounting portion 22. The thickness of the connecting wall portion 23 in the vicinity of the outer end, which is connected to the bobbin trunk 21, is thicker than the other portions of the connecting wall portion 23.

Figure 4:
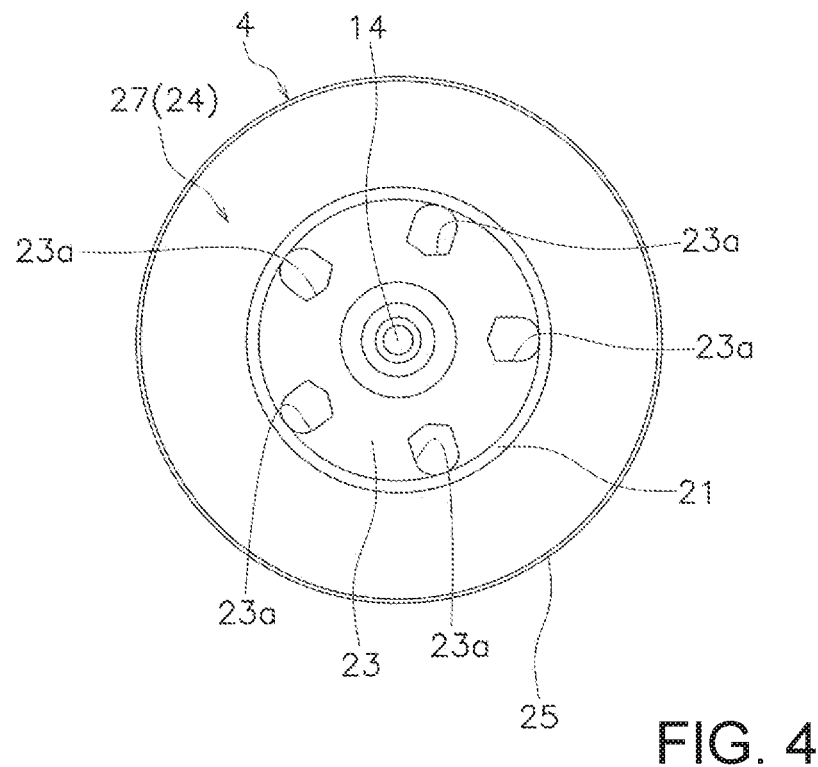
FIG. 4 is a right side view of the spool to which the spool shaft is attached.

FIG. 4 shows a right-side view of the spool 4, which is attached to the spool shaft 14. As shown in FIG. 4, the connecting wall portion 23 has a plurality of axially penetrating second through-holes 23a. The second through-holes 23a are formed at intervals in the circumferential direction. The second through-holes 23a are formed so as to be continuous with the first through-holes 21a in the vicinity of the outer end of the connecting wall portion 23. Accordingly, the same number of the second through-holes 23a are formed in the connecting wall portion 23 as the first through-holes 21a.

The pair of flange portions 24 are essentially disk-shaped and extend radially outwardly from the two ends of the bobbin trunk 21. The pair of flange portions 24 are sloped, expanding axially outwardly as they extend radially outwardly. The pair of flange portions 24 are inclined, becoming smaller in diameter with an axially decreasing distance to the center C of the bobbin trunk 21. As shown in FIG. 4, the pair of flange portions 24 do not have an axially penetrating through-hole.

The pair of flange portions 24 includes a first flange portion 27 and a second flange portion 28. The first flange portion 27 extends from the right end of the bobbin trunk 21 in the radially outward direction. The first flange portion 27 includes a first tapered portion 27a and a second tapered portion 27b.

The first tapered portion 27a extends radially outwardly from the right end of the bobbin trunk 21. The first tapered portion 27a is formed with a decreasing thickness in the radially outward direction.

Specifically, the first tapered portion 27a includes a first end portion 31 and a second end portion 32. The first end portion 31 is connected to the right end of the bobbin trunk 21. The first end portion 31 is thickest at the first tapered portion 27a. A thickness T2 of the first end portion 31 is preferably at least 0.4 millimeters and no more than 0.6 millimeters. The thickness T2 of the first end portion 31 is preferably at least 0.4 millimeters and no more than 0.5 millimeters. The thickness T2 in the present embodiment is, for example, 0.45 millimeters.

The second end portion 32 is connected to the second tapered portion 27b. The second end portion 32 is thinnest at the first tapered portion 27a. Thickness T3 of the second end portion 32 is preferably at least 0.3 millimeters and no more than 0.4 millimeters. The thickness T3 of the second end portion 32 in the present embodiment is, for example, 0.35 millimeters.

The thickness of the first tapered portion 27a preferably decreases in the radially outward direction at a taper ratio of at least 0.3% no more than 1%. The thickness of the first tapered portion 27a more preferably decreases in the radially outward direction at a taper ratio of at least 0.3% and no more than 0.7%. The taper ratio of the first tapered portion 27a in the present embodiment is, for example, 0.34%. Here, for example, the taper ratio T can be calculated by the formula (1) below, where the taper ratio is T, the length from the first end portion 31 to the second end portion 32 is L, the thickness of the first end portion 31 is T2, and the thickness of the second end portion 32 is T3.

$$T=(T2-T3)/L \times 100 \quad (1)$$

Figure 5:
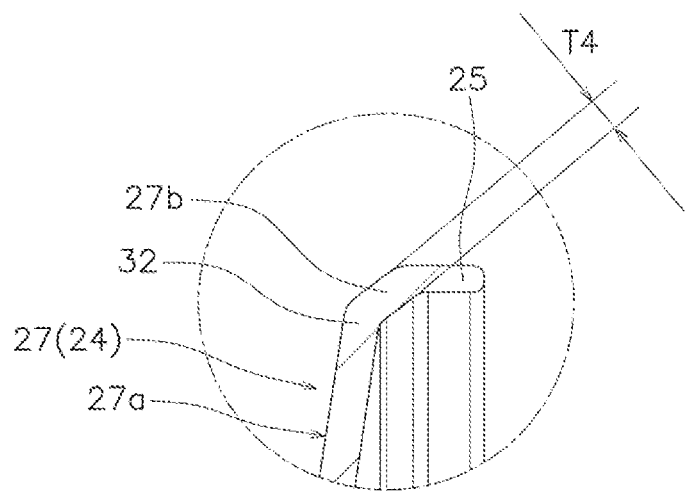
FIG. 5 shows an enlargement of a detail of FIG. 2.

FIG. 5 is a partially enlarged view of FIG. 2, and is an enlarged cross-sectional view of the periphery of the cylindrical portion 25. The second tapered portion 27b extends from the second end portion 32 of the first tapered portion 27a further outwardly in the axial direction. The second tapered portion 27b has a more gradual slope than the first tapered portion 27a. The boundary between the second tapered portion 27b and the first tapered portion 27a serves as a rough indicator of the maximum winding position of the fishing line on the spool 4. Thickness T4 of the second tapered portion 27b can be uniformly formed. The thickness T4 of the second tapered portion 27b is preferably about the same thickness as the thickness T3 of the second end portion 32. The thickness T4 of the second tapered portion 27b in the present embodiment is 0.36 millimeters, for example, slightly greater than the thickness T3 of the second end portion 32.

The second flange portion 28 extends from the left end of the bobbin trunk 21 in the radially outward direction. The second flange portion 28 includes a first tapered portion 28a and a second tapered portion 28b. The first tapered portion 28a includes a first end portion 33 and a second end portion 34. The first end portion 33 is connected to the left end of the bobbin trunk 21. The second end portion 34 is connected to the second tapered portion 28b. The second flange portion 28 is bilaterally symmetrical with the first flange portion 27 across the center C of the bobbin trunk 21 in the axial direction.

The average width AW between the first tapered portion 27a and the first tapered portion 28a is preferably less than or equal to 60% of an outer diameter D2 of the cylindrical portions 25, 26. The average width AW is more preferably 50% or more and 55% or less of the outer diameter D2 of the cylindrical portions 25, 26. The average width AW in the present embodiment is, e.g., about 53% of the outer diameter D2 of the cylindrical portions 25, 26. The average width AW can be calculated using the formula (2) below, where the width between the outer peripheral portion of the first end portion 31 and the outer peripheral portion of the first end portion 33 is W1, and the width between the outer peripheral portion of the second end portion 32 and the outer peripheral portion of the second end portion 34 is W2.

$$AW=(W1+W2)/2 \quad (2)$$

The cylindrical portions 25, 26 extend axially outwardly from the distal end portions of the pair of flange portions 24. The cylindrical portions 25, 26 can increase the strength of the pair of flange portions 24, and prevent the fishing line from entering the gap between the frame 6 and the spool 4. Here, the thickness of the thinnest part of the first tapered portion 27a, that is, the thickness T3 of the second end portion 32, is preferably greater than or equal to thickness T5 of the cylindrical portions 25, 26. In addition, the thickness T4 of the second tapered portion 27b is preferably greater than or equal to the thickness T5 of the cylindrical portions 25, 26. The thickness T5 of the cylindrical portions 25, 26 in the present embodiment is 0.3 millimeters, for example.

As shown in FIG. 2, the outer circumferential surface of the cylindrical portion 25 is disposed opposing the inner circumferential surface of the first side plate 6a. A slight gap is disposed between the outer circumferential surface of the cylindrical portion 25 and the inner circumferential surface of the first side plate 6a. The outer circumferential surface of the cylindrical portion 26 is disposed so as to oppose the inner circumferential surface of the second side plate 6b. A slight gap is disposed between the outer circumferential surface of the cylindrical portion 26 and the inner circumferential surface of the first side plate 6a.

As shown in FIG. 3, the axial width W3 of the cylindrical portion 25 is smaller than axial width W4 of the cylindrical portion 26. Accordingly, as shown in FIG. 2, the range over which the outer circumferential surface of the cylindrical portion 26 and the inner circumferential surface of the first side plate 6a overlap in the radial direction is smaller than the range over which the outer circumferential surface of the cylindrical portion 25 and the inner circumferential surface of the first side plate 6a overlap.

As shown in FIG. 1, the casting control mechanism 12 brakes the rotation of the spool 4 by axially pressing against the spool shaft 14. The braking force of the casting control mechanism 12 can be adjusted by rotating a knob member 40 disposed on the handle 3 side. A first friction member 41 that can contact one end of the spool shaft 14 is disposed inside the knob member 40. This first friction member 41 moves axially in accordance with the rotation of the knob member 40. In addition, a second friction member 42 that can contact the other end of the spool shaft 14 is immovably disposed on the other end side of the spool shaft 14.

For example, when the knob member 40 is rotated and the first friction member 41 moves in a direction away from the spool shaft 14 (right side in FIG. 2), the spool shaft 14 moves from the position shown in FIG. 2 toward the right side in the axial direction, resulting in the possibility that a gap will be formed between the cylindrical portion 26 and the second side plate 6b in the axial direction. On the other hand, with respect to the cylindrical portion 25, even if the spool shaft 14 moves from the position shown in FIG. 2 toward the right side in the axial direction, there is no possibility of forming a gap between the cylindrical portion 25 and the first side plate 6a in the axial direction. Thus, it is possible to make the axial width W3 of the cylindrical portion 25 smaller than the axial width W4 of the cylindrical portion 26. It is thereby possible to reduce the weight of the spool 4.

In the dual bearing reel 100 configured in this manner, since axially penetrating through-holes are not formed in the pair of flange portions 24 of the spool 4, it is possible to avoid or suppress a decrease in the bending strength of the pair of flange portions 24 while reducing the weight of the spool 4 by decreasing the thickness of the pair of flange portions 24. In addition, since the thickness of the pair of flange portions 24 increases with a decreasing distance to the bobbin trunk 21, it is possible to effectively avoid or suppress a decrease in the bending strength of the pair of flange portions 24 while reducing the weight of the pair of flange portions 24. Moreover, since the average width AW between the first tapered portion 27a and the first tapered portion 28a is less than or equal to 60% of the outer diameter D2 of the cylindrical portions 25, 26, the distance from the center C of the bobbin trunk 21 in the axial direction to the pair of flange portions 24 is shorter than in the prior art, and it is possible to reduce the bending moment that acts on the bobbin trunk 21. It is thereby possible to maintain sufficient bending strength of the bobbin trunk 21, even if, for example, the weight is reduced by reducing the thickness of the bobbin trunk 21.

Other Embodiments

One embodiment of the present invention and modified examples thereof is described above, but the present invention is not limited to the above-described embodiment and modified examples, and various modifications can be made without departing from the scope of the invention. In particular, the embodiments and various modified examples described herein can be arbitrarily combined as required.

In the embodiment described above, the spool 4 is fixed to the spool shaft 14, the spool 4 can be supported by the reel body 2 so as to be rotatable with respect to the spool shaft 14, for example.

In the embodiment described above, the outer circumferential surface of the bobbin trunk 21 is sloped such that the distance to the axis of rotation A gradually decreases axially with a decreasing distance to the center C of the bobbin trunk 21, but a sloping surface is not necessarily required.

What is claimed is:

1. A spool of a dual-bearing reel, comprising:
   a bobbin trunk having a first end and a second end;
   a pair of flange portions, a first flange portion of the pair of flange portions extending outwardly from the first end of the bobbin trunk in a radial direction with respect to an axis of rotation of the spool and a second flange portion of the pair of flange portions extending outwardly from the second end of the bobbin trunk in the radial direction with respect to the axis of rotation of the spool, the first and second flanges do not have through-holes penetrating therethrough in an axial direction with respect to the axis of rotation; and
   cylindrical portions extending outwardly from distal end portions of the pair of flange portions in the axial direction with respect to the axis of rotation,
   the first and second flange portions having a first tapered portion and a second tapered portion, respectively, each of the first tapered portion and the second tapered portion becoming thinner in a radially outward direction, and
   an average width between the first and second tapered portions being less than or equal to 60% of an outer diameter of the cylindrical portion.

2. The spool of the dual-bearing reel according to claim 1, wherein
   the minimum diameter of the bobbin trunk is less than or equal to 60% of the outer diameter of the cylindrical portion.

3. The spool of the dual-bearing reel according to claim 1, wherein
   a thickness of the first and second tapered portion decreases in the radially outward direction with a taper ratio of 0.3% or more and 1% or less.

4. The spool of the dual-bearing reel according to claim 1, wherein
   a thickness of a distal end portion of each of the first and second tapered portions is greater than or equal to a thickness of the cylindrical portion.

5. The spool of the dual-bearing reel according to claim 1, wherein
   a thickness of a thickest portion of each of the first and second tapered portions is at least 0.4 millimeters and no more than 0.6 millimeters.

6. The spool of the dual-bearing reel according to claim 1, further comprising
   a disk-shaped connecting wall portion on an inner peripheral portion of a center of the bobbin trunk,
   a through-hole is formed only at a portion of the bobbin trunk connected to the connecting wall portion, and
   a thickness of the bobbin trunk is at least 0.4 millimeters and no more than 0.5 millimeters.

7. A dual-bearing reel, comprising:
   a reel body;
   a handle rotatably supported by the reel body; and
   the spool according to claim 1 rotatably disposed on the reel body.

* * * * *